Patented Sept. 20, 1932

1,878,982

UNITED STATES PATENT OFFICE

CHRISTIAN J. HANSEN, OF ESSEN-RUHR, GERMANY, ASSIGNOR, BY MESNE ASSIGNMENTS, TO THE KOPPERS COMPANY OF DELAWARE, OF PITTSBURGH, PENNSYLVANIA, A CORPORATION OF DELAWARE

TREATING THIOCYANATES

No Drawing. Original application filed August 9, 1928, Serial No. 298,617, and in Germany April 14, 1928. Divided and this application filed November 29, 1929. Serial No. 410,650.

My invention refers to the treatment of thiocyanogen compounds and more especially ammonium thiocyanate, whereby a decomposition of such compounds is obtained and sulfur and the corresponding sulfates, such as ammonium sulfate, are recovered. It is an object of my invention to provide means whereby this decomposition of the thiocyanogen compounds and conversion into sulfates and free sulfur can be effected in a simpler and more efficient manner and at lower cost, than was hitherto possible.

Hitherto solutions of ammonium thiocyanate, such as resulted for instance in the purification of gases developed in the distillation of carbon and other carbonaceous material, have been subjected to hydrolitic decomposition by heating same with acids, more especially with dilute sulfuric acid. This decomposition results in the formation of ammonium sulfate and carbon oxysulfide, which is partly decomposed in the presence of water into carbon dioxide and hydrogen sulfide. This way of proceeding entails the drawback that it requires a considerable outlay for the sulfuric acid required in the decomposition, and the sulfur compounds resulting in the reaction must be subjected separately to further treatment.

In my copending application, Serial No. 298,617, filed August 9, 1928, I have described a generally applicable method of decomposing thiocyanates and of forming ammonium compounds therefrom by heating an aqueous solution of such thiocyanates in the presence of compounds containing the radical $SO_2$.

According to the present invention the thiocyanates contained in the coal distillation gases can be converted into ammonium sulfate and free sulfur in a particularly simple and effective manner. No addition of further reagents such as sulfuric acid is required, and the ammonium thiocyanate is rapidly converted in a single operation into ammonium sulfate and free sulfur.

I have ascertained that if ammonium thiocyanate or other thiocyanates are heated in the presence of water, the occurring hydrolytic reaction, viz.

$$NH_4CNS + 2H_2O = CO_2 + H_2S + 2NH_3$$

which results in the formation of ammonia and of hydrogen sulfide, is greatly promoted by the presence of bisulfite or bisulfite and sulfite. The latter compounds are known to be decomposed on being heated into sulfate and free sulfur, with or without a concomitant formation of free sulfuric acid. However, in the practice of my invention, all the reactions mentioned above occur simultaneously and promote each other considerably. This valuable result is apparently due to the instantaneous and continuous absorption by the bisulfite not only of the ammonia, but also of the hydrogen sulfide developed in the hydrolytic reaction mentioned above.

It is well known that a complete decomposition of bisulfite and sulfite into sulfate and free sulfur requires predetermined proportions of the several constituents, i. e. that for each two molecules of a bisulfite one molecule of sulfur must be present. If the quantities of sulfite in solution are greater, complete decomposition is not possible inasmuch as in that case the solution contains besides sulfate also non-decomposed sulfide. If there is bisulfite in excess in the solution, there is formed, when operating in closed vessels, besides ammonium sulfate a corresponding quantity of free sulfuric acid.

Before going into the details of my invention and how the same is carried out in practice, I will first explain the facts on which this invention is based.

First of all I found that ammonium thiocyanate can be decomposed in a quantitative manner by heating an aqueous solution thereof with sulfur dioxide, ammonium bisulfite or ammonium thiosulfate in combination with sulfur dioxide.

The following equation serves to illustrate this decomposition.

I.  $NH_4CNS + 2H_2O + 2SO_2 =$
$$(NH_4)_2SO_4 + CO_2 + 2S.$$

This reaction can be explained as follows:

The decomposition of thiocyanic acid occurs according to the equation:

II.  $HCNS + H_2O = NH_3 + COS$

Carbon oxysulfide is further decomposed in contact with water according to the equation:

III.  $COS + H_2O = CO_2 + H_2S$

Thus from 1HCNS is finally formed 1NH₃ and 1H₂S.

If ammonium thiocyanate is treated in this way, 2NH₃ and 1H₂S will result.

In order to produce $1(NH_4)_2SO_4$ from NH₄CNS, the sulfur dioxide must first be converted into SO₃ according to the equation:

IV.  $3SO_2 = 2SO_3 + S$

Therefore in order to obtain 1SO₃, 1.5SO₂ is required, which results in 1SO₃ + 0.5S.

Further in order to convert the hydrogen sulfide obtained in the decomposition of COS (Equation III) into sulfur, I require according to the equation:

V.  $2H_2S + SO_2 = 3S + 2H_2O$, additional 0.5SO₂ per molecule ammonium thiocyanate.

If the above quantities of SO₂ are added, there results, that per molecule ammonium thiocyanate 2SO₂ are required, which furnish 0.5 + 1.5 = 2S.

The above proves that Equation I is covered.

In order to carry this process through, 2SO₂ must be produced by oxidation of 2S per molecule ammonium thiocyanate. However, as just 2S are recovered in the processes in the form of elementary sulfur, no extraneous sulfur at all is required in the process.

The conversion according to Equation I takes place slowly at ordinary temperature, while at 100° C. about 50 per cent of a 20 per cent solution of NH₄CNS will be decomposed in eight to ten hours. At a temperature between 180 and 200° C. the ammonium thiocyanate will be decomposed quantitatively in not more than two hours.

If operating with polythionate instead of sulfur dioxide, the reaction occurs according to the following equation:

VI.  $NH_4CNS + 2H_2O + 2(NH_4)_2S_3O_6 = 3(NH_4)_2SO_4 + CO_2 + 4S$.

This reaction can be explained as follows:

According to the equation

VII.  $(NH_4)_2S_3O_6 = (NH_4)_2SO_4 + SO_2 + S$ 1 molecule tritrionate when heated, is decomposed into 1 molecule sulfate, 1SO₂ + 1S. If higher polythionates are used, the same compounds will result, but in that case more sulfur is obtained, for instance in the case of tetrathionate 2S, in the case of pentathionate 3S.

The equation VII thus shows that here 1 polythionate is equivalent of 1SO₂.

The equation VI further shows that by using trithionate 4S, by the use of tetra- and pentathionate 6 and 8S respectively are obtained.

The production of polythionate, such as the trithionate from thiosulfate occurs according to the following equation:

VIII.  $2(NH_4)_2S_2O_3 + 3SO_2 = 2(NH_4)_2S_3O_6 + S$.

This reaction occurs in several intermediate steps, only one of which has hitherto been ascertained. When introducing sulfur dioxide into a solution of thiosulfate, in contradistinction to the treatment of thiosulfates with other acids no or very little sulfur will at first separate, and the solution will remain limpid and will at the same time assume a deep yellow color. The solution now contains an additive compound of 1 molecule thiosulfate and 1 molecule SO₂. The polythionate will form from these two compounds, the formation occurring slowly at ordinary temperature and more rapidly upon heating.

If it is desired to produce sulfate from thiosulfate by way of a polythionate, the simplest method is that which follows the equation:

IX.  $(NH_4)_2S_3O_6 + 2(NH_4)_2S_2O_3 = 3(NH_4)_2SO_4 + 4S$.

In order to satisfy this equation merely one-third of the thiosulfate must be converted into polythionate with the aid of sulfur dioxide. According to equation VIII each molecule polythionate to be produced requires 1.5SO₂, which shows that in order to convert thiosulfate into sulfate, 0.5SO₂ must be added per molecule thiosulfate.

Taking into consideration the equations VIII and IX, the conversion of thiosulfate into sulfate occurs according to the equation:

X.  $2(NH_4)_2S_2O_3 + SO_2 = 2(NH_4)_2SO_4 + 3S$.

The equations VI and VIII further show that a mixture of ammonium thiosulfate and ammonium thiocyanate can be converted by means of sulfur dioxide into sulfate and sulfur according to the equation:

XI.  $NH_4CNS + 2H_2O + 2(NH_4)_2S_2O_3 + 3SO_2 = 3(NH_4)_2SO_4 + CO_2 + 5S$

This equation shows how ammonium thiosulfate and ammonium thiocyanate can be converted directly into sulfate and sulfur by acting with sulfur dioxide.

I may, however, also convert ammonium thiocyanate into sulfate and sulfur with the aid of ammonium bisulfite according to the equation.

XII.  $NH_4CNS + 8NH_4HSO_3 = 5(NH_4)_2SO_4 + CO_2 + 2H_2O + 4S$.

This reaction can be explained as follows:

As shown in equation I, 2SO₂ are required per molecule $NH_4CNS$. On the other hand a mixture of 1 molecule ammonium sulfite and 2 molecules ammonium bisulfite when heated, will also be converted into sulfate and sulfur according to the equation

XIII.  $(NH_4)_2SO_3 + 2NH_4HSO_3 = 2(NH_4)_2SO_4 + S + H_2O.$

Now as $1NH_4CNS$ requires $2SO_2$, the double of the quantities shown in equation XIII must be used. The $2SO_2$ are bound by the sulfite which is thus converted into bisulfite. This shows the way, in which the $8NH_4HSO_3$ are required according to equation XII per molecule $NH_4CNS$.

All these conversions of ammonium thiocyanate take place slowly at ordinary temperature, more rapidly at an elevated temperature. At about 100° C. about one half of the ammonium thiocyanate is decomposed within eight to ten hours, while at 180–200° C. the conversion will be completed in one to two hours, all ammonium thiocyanate having disappeared.

If less sulfur dioxide, bisulfite or polythionate is used than corresponds to the respective equations, the reaction will not be complete and the liquor will usually still contain some ammonium thiosulfate and non-decomposed ammonium thiocyanate. On the other hand an excess of sulfur dioxide bisulfite or polythionate will not be harmful, the conversion being quantative and the excess of sulfur dioxide being converted into sulfuric acid and sulfur according to equation IV. In this case the liquor contains more or less sulfuric acid, which can be neutralized by adding ammonia before evaporation.

The process is preferably carried through at a temperature which materially exceeds 100° C., for instance at 140–160° or above, and under increased pressure. The ammonium thiocyanate may be contained in the liquor from the beginning. If in the purification of coal distillation gases the contents of cyanogen compounds are recovered separately under the form of ammonium thiocyanate, bisulfite and sulfite, or corresponding quantities of sulfur dioxide and ammonia may be added to the solution thus obtained.

On the other hand, if the ammonium thiocyanate is recovered in a separate washing operation, it is also possible to force the solution of ammonium thiocyanate thus obtained, which may be preheated into the heated decomposition vessel containing an aqueous solution of bisulfite and sulfite.

*Example 1*

A solution of 100 kgs. ammonium thiocyanate and 1042 kgs. ammonium bisulfite in 1000 kgs. water is heated in a closed pressure resisting vessel to about 180° C. After four to six hours all the thiocyanate is decomposed into sulfate and sulfur. The resulting watery solution contains 868 kgs. ammonium sulfate. There are further obtained 168.5 kgs. pure molten sulfur and 57.8 kgs. carbon dioxide, which may be tapped off.

I may also introduce the bisulfite gradually during the heating period. If the reaction is carried through at 220° C., the conversion will already be complete in one or two hours, while at a lower temperature longer heating is required.

*Example 2*

A solution of 100 kgs. ammonium thiocyanate and 1433 kgs. ammonium bisulfite in 2000 kgs. water is treated as described with reference to Example 1. The resulting watery solution contains 1128 kgs. ammonium sulfate and 64.4 kgs. free sulfuric acid. There are further obtained 210.6 kgs. pure molten sulfur and 57.8 kgs. carbon dioxide.

*Example 3*

A solution of 100 kgs. ammonium thiocyanate, 2083 kgs. ammonium bisulfite and 610 kgs. ammonium sulfite in 2700 kgs. water is treated as described with reference to Example 1. The watery solution resulting in the reaction contains 2257 kgs. ammonium sulfate and there are further obtained 337 kgs. pure molten sulfur and 57.8 kgs. carbon dioxide.

Various changes may be made in the details disclosed in the foregoing specifications without departing from the invention or sacrificing the advantages thereof.

In the claims affixed to this specification no selection of any particular modification of the invention is intended to the exclusion of other modifications thereof.

I claim:—

1. The method of decomposing thiocyanates and of producing ammonium compounds therefrom comprising heating an aqueous solution of such thiocyanates in the presence of a bisulfite.

2. The method of decomposing thiocyanates and of producing ammonium compounds therefrom comprising heating an aqueous solution of such thiocyanates under pressure to about 180–220° C. in the presence of a bisulfite.

3. The method of decomposing thiocyanates and of producing ammonium compounds therefrom comprising heating an aqueous solution of such thiocyanates in the presence of a bisulfite and a sulfite.

4. The method of decomposing thiocyanates and of producing ammonium compounds there from comprising heating an aqueous solution of such thiocyanates under pressure to about 180–220° C. in the presence of a bisulfite and a sulfite.

5. The method of decomposing ammonium thiocyanate and of producing ammonium compounds therefrom comprising heating an aqueous solution of such thiocyanate under pressure to about 180–220° C. in the presence of ammonium bisulfite.

6. The method of decomposing ammonium thiocyanates and of producing ammonium compounds therefrom comprising heating an aqueous solution of such thiocyanate under pressure to about 180–220° C. in the presence of ammonium bisulfite and ammonium sulfite.

In testimony whereof I affix my signature.

CHRISTIAN J. HANSEN.